Patented Sept. 19, 1950

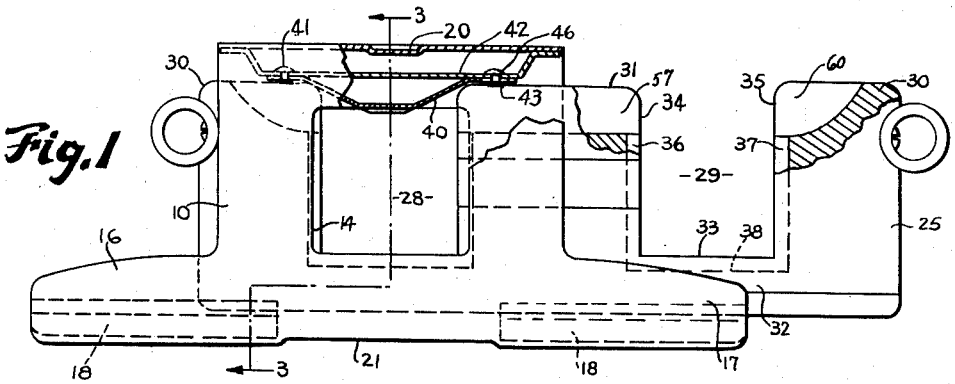

2,522,760

UNITED STATES PATENT OFFICE 2,522,760

SLIDE CARRIER FOR SUPPORTING LANTERN SLIDES OF VARYING THICKNESSES

David D. Lowber, Albin A. Gradisar, and David I. Critoph, Snyder, N. Y., assignors to American Optical Company, Southbridge, Mass., a voluntary association of Massachusetts Application May 9, 1947, Serial No. 746,920

6 Claims. (Cl. 88—28)

1

This invention relates generally to photographic slide projectors and the like. More particularly it relates to means for quickly, conveniently and accurately locating transparent lantern slides of various commonly used types in proper position in a projector for projection purposes.

Many slide projectors in common use today are of a type having an open chamber extending transversely of the projector, and associated therewith at such opening is guide means of one kind or another arranged to receive a slide carrier or holder for transporting transparent lantern slides, or the like, into and out of the projection position. Such a holder or carrier is customarily provided with two apertured sections arranged to receive lantern slides and these sections are so spaced that a slide in one section may be positioned for projecting the picture carried thereon while another slide is being placed in or removed from the other section. Since the several different common types of lantern slides vary appreciably in thickness and since it is not uncommon to have two or more types of slides in a collection of slides, it is a problem in the common forms of slide carriers to have the picture carrying portion of each successive slide move into and be accurately positioned in the projector at the focal plane of the objective. Because of these variations in thicknesses of the slides repeated refocusing of the objective was formerly necessary during a single showing, in order to have accurate imaging upon the screen for each and every successive picture. Furthermore, the increased use of projectors having relatively short focal lengths and adapted for pictures of relatively small sizes, such as 35 mm. and the like, has increased the importance of accurate positioning of the picture carrying portion of each successive slide. Also, the commonly used forms of slide carriers generally employed spring means or the like for holding each slide in its relatively fixed position in the carrier and was of such construction that some pressure or "pull" had to be exerted upon the slide being loaded into or removed from the carrier. In such structures, it was not unusual to have this manipulation of the slide jar or disturb the other slide being projected to such an extent that the projected image on the screen was objectionably moved.

It is, accordingly, an object of the present invention to provide for photographic slide projectors and the like suitable supporting and guiding means and a slide holder or carrier arranged to function therewith, the construction of the parts being such that the carrier may be moved freely transversely in the guiding means and when positioning a slide in the projection position the carrier will be accurately located in the guiding means and the slide will be in turn engaged and accurately located by surfaces carried by the guiding means and the carrier, whereby the picture carrying portions of lantern slides of various conventional types may be accurately located in the focal plane of the projector objective.

It is a further object of the invention to provide efficient and economical means in the form of a supporting frame and an associated slide holder or carrier for use with projectors, and which frame and holder are provided with suitable means for allowing easy insertion and removal of lantern slides of various types relative to the slide holder and with suitable means arranged to function therewith for accurately locating the slide to be projected in the optical system of the projector. It is a further object of the invention to provide a slide carrier or holder and supporting structure therefor which are of a sturdy and inexpensive construction and which embody parts free from close tolerances but which nevertheless function smoothly and easily for accurately positioning slides of various thicknesses in the focal plane of the projector objective.

Other objects and advantages of the invention will become apparent from the detailed description which follows when taken in conjunction with the accompanying drawing in which:

Fig. 1 is an elevational view of a supporting frame and an associated slide carrier, with parts of the supporting frame and carrier being broken away to better show the details of the construction;

Fig. 2 is a plan view of the structure shown in Fig. 1;

Fig. 3 is a vertical sectional view taken substantially on section line 3—3 of Fig. 1;

Fig. 4 is a plan view of spring means employed in the structure of Fig. 1;

Fig. 5 is a sectional view of said spring means;

Fig. 6 is a side elevational view of a slightly modified form of the supporting frame and carrier embodying the invention;

Fig. 7 is a fragmentary view of a portion of a slide carrier similar to Fig. 1 but showing a slight modification thereof;

Fig. 8 is a fragmentary sectional view showing a modified form of supporting and guiding means for the slide carrier; and Fig. 9 is a fragmentary view showing a modified form of slide engaging and centering means.

Referring to the drawing in detail and particularly Figs. 1, 2 and 3, it will be seen that the invention comprises a hollow supporting frame 10 which is preferably of sheet metal and comprises a pair of side plates 11 and 12 integrally connected at their upper edges by an upper wall or plate member 13. In each of the side plates 11 and 12 is provided a centrally located projection opening 14 and to either side of such openings the side plates are laterally extended, as indicated by numerals 16 and 17, to provide outwardly projecting pairs of supporting arms. Each pair of supporting arms is in turn rigidly secured together by an inverted channel shaped member 18 as clearly shown by Fig. 3. These members 18 are preferably also formed of sheet metal and may be fixedly secured in place by welding, brazing or the like to provide the rigid open frame 10.

The upper wall 13 adjacent the central portion thereof is provided with an elongated depression 20 and the lower edges of the side plates 11 and 12 are slightly recessed, as indicated at 21, inwardly of the inner ends of members 18. This depression and the recesses 21 together function to engage parts of a conventional projector when the frame is positioned in the transverse open chamber thereof, said depression being elongated to allow a limited lateral adjustment of the frame before a locking screw or the like carried by the projector is seated within the depression for locking the frame in place.

The channel shaped members 18 are provided intermediate their side plates 19 with substantially V-shaped grooves 23 which are of such size that they will slidably receive and support the lower edge of a slide carrier or slide holder 25. The carrier has its lower edge provided with complementary sloping or tapered walls 26 arranged to extend partly into the grooves 23 and engage the sloping side wall portions 27 of members 18. While there is only a very slight clearance between the sides of the slide carrier 25 and the side plates 11 and 12 to allow free transverse sliding movement of the carrier with a minimum of "play" or movement at the upper edge, the sloping walls 26 serve to accurately locate the lower edge of the carrier upon the members 18. The importance of this arrangement will be described more fully hereinafter.

The slide carrier 25 is provided with a pair of projection openings or apertures 28 and 29 formed by a pair of upstanding end members 30 and an upstanding intermediate member 31 interconnected by rigid bar portions 32. It will be seen that this intermediate member, between the projection apertures or openings 28 and 29, is of such a width that the apertures are spaced sufficiently to allow a slide positioned in one aperture to be removed while a slide positioned in the other aperture is in the projection position. Each projection aperture 28, or 29, is formed by a bottom wall 33 and spaced side walls 34 and 35. A groove 36 is formed in the vertical side wall 34 and a similar groove 37 is formed in the vertical side wall 35 while an interconnecting groove 38 is formed in the bottom wall 33. Grooves 36 and 37 are of such width and relative spacing that they will closely but freely receive either thick or thin lantern slides of a given size when placed therein while the associated bottom groove 38 has surfaces 39 sloped and arranged to form a V-shaped support so that each slide will gravitate toward the bottom of groove 38 and accordingly have its bottom edge accurately centered relative to the central vertical transverse plane of the slide carrier and supporting frame. Handles are provided at opposite ends of the slide carrier for manipulating same and additionally serve to limit the lateral travel of the carrier in both directions.

As mentioned above, several different types of lantern slides are in common use today. For example, one of the thinner types comprises photographic film mounted between the two halves of a heavy paper or cardboard frame or mask. On the other hand, one of the thicker types of slides comprises photographic films or the like mounted between the two parts of a paper mask and between two pieces of protecting glass which are secured together by a channel shaped metal band. The grooves 36 and 37, however, are made of such width that either thick or thin slides may be slipped easily into place to occupy the aperture 28 or 29 with the bottom edge of the slide resting on the sloping surfaces 39 of the V-shaped groove 38. When the slide is so positioned, the upper edge will be free for slight relative side to side movement, while the bottom edge will be held substantially exactly located relative to the vertical transverse plane passing through the apexes of the sloping surfaces 39.

To cooperate with the grooves 36, 37 and 38 in moving the slide into its projection position between the openings 14, there is provided additional means in the form of a slide engaging and centering member 40 which is made in the form of a yieldable leaf spring having one end portion thereof fixedly secured, as indicated at 41, to a spacing member 42 and having its opposite end portion slotted, as indicated at 44, so as to have sliding engagement at 43 with a guiding and confining rivet or the like 46 fixedly carried by the spacing member 42. The spacing member may be spot welded or otherwise secured at its opposite end portions to the top wall 13 of the frame 10. As best shown in Figs. 3, 4 and 5, this spring member 40 is formed with a central V-shaped rigid portion 48, upwardly and outwardly extending spring leaf portions 50 and attaching end portions 52 and 54. The V-shaped portion 48 extends parallel to the grooves 38 and is arranged to yieldably engage and center the upper edge portion of a slide positioned in the slide carrier and in alignment with openings 14. At this time the vertical edges of the slide will be unsupported, the slide being entirely supported and centered by the grooves 38 and 48 alone.

If a slide is placed in one aperture 28, or 29, of the slide carrier while a slide in the other aperture is being projected, it will slip freely and easily into engagement with the sloping surfaces 39 without requiring that the operator exert any pressure thereon. Thus it is a very easy matter for the operator to insert or remove a slide without jarring the picture being projected. If the carrier is then moved laterally to position the slide between openings 14, an upper corner of the slide will engage one of the sloping portions 50 of the spring member 40 and cause the spring member to flex slightly upwardly to allow the slide to move beneath the grooved portion 48 as it moves into the projection position. It will be clear from Fig. 3 that, at such time, the upper edge of the slide will be engaged and retained within the V-shaped portion 48 of the flexed spring member 40 and since the lower edge of the slide is seated in the V-shaped groove 38 the central picture carrying portion of the slide, whether the slide be thick or thin, will be held in substantially the vertical transverse plane 56 passing through the centers of these V-shaped grooves. Since the lower edge of the slide carrier is always centered by the V-groove in channel members 18 and the side-to-side movement, if any, at the top of the slide carrier is practically imperceptible, the side-to-side movement of the surfaces 39 will be proportionally less and have no material effect upon the position of the slide. And since the picture carrying portions of most slides are located substantially at the center of the slide, these slides will be, for all practical purposes, properly focused when they are moved into the projection position. Spring member 40 need only be of a sufficient strength to engage the upper edge of the slide and produce the centering effect desired. The rivet or restraining means 46 is made of such size and shape as to closely fit and slidably guide the slotted portion 54 of the spring.

The upper portion of the intermediate part 31 is provided with a groove 57 having sloping surfaces 58 and portions of the end members 30 are partially grooved as indicated by the numeral 60 to provide sufficient clearance for the downwardly extending spring member 40 and to provide guiding means so that slides may be more easily positioned in the apertures 28 and 29. Obviously the slide 25 may be elongated and provided with more than two projection apertures, if desired.

While the construction of Fig. 1 employs the spacing member 42 for supporting the spring 40 in a proper position for engagement by slides of a relatively small size fitting the carrier 25, it will be appreciated that the invention may readily be employed in structures arranged to accommodate slides of larger sizes. In Fig. 6, a supporting frame 62, similar to frame 10, is shown and provided with projection openings 64 of a larger size. The slide receiving aperture 65 is likewise of a larger size. In such a construction, it has been found desirable to omit the spacing member 42 and attach the V-grooved leaf spring member 66 directly to the upper connecting plate 68. However, the manner of attachment of this spring member to the plate and its mode of operation are similar to the construction shown in Fig. 1, the only real difference being that larger size pictures may be properly located therein for projection purposes.

While portions 30, 31 and 32 of the slide carrier of Fig. 1 have been shown as integral and as such would probably be formed of molded plastic material or the like, it will be apparent to those skilled in the art that should it be desired to construct the slide carrier 25 of a different material such as hard wood, or wood and metal, the slide carrier could be readily formed of several separate pieces and secured together in known manner to effect a unitary slide carrier structure of the type shown, and as such would function properly in the manner desired.

In Fig. 1, the channel shaped members 18 are spaced from each other an appreciable amount and support and guide the carrier 25 in its back and forth travel. If desired, the interconnecting rigid bar portion 32 of the slide carrier may be provided with a series of more or less vertically extending ducts or holes 70, as shown in Fig. 7, to provide ventilating or cooling means for the slides when positioned in the beam of the projector. Whether the projector is provided with a blower or not, cooling air may pass upwardly between members 18 and through these holes and afford a certain amount of cooling for both sides of the slide.

A modified form of guiding and centering means for the slide carrier is shown in Fig. 8 and may employ inner oppositely sloping surfaces 72 in the bottom wall of the carrier 73 arranged to rest upon and be centered by a member 74 having complimentary sloping wall portions 76. In such a construction vertically extending cooling ducts 78 may be employed if desired.

A modified form of slide engaging and centering means which may be used in place of the leaf spring means previously described is shown in Fig. 9. It comprises an elongated weight or block 80 which is of such a width that it will fit closely but will move freely vertically between the side plates 82 and 84 of the slide carrier supporting frame. Two pairs of vertical slots 86 are provided in the side plates so that the opposite free ends of a pair of pins 88, which extend through the block near its opposite ends, will be confined within and guided by the slots. The block has a semi-circular lower surface provided with a centrally located V-shaped groove 90 for engaging and centering the upper edge of slides when each slide is moved by the slide carrier into the projection position. The weight of the block 80 alone may be relied upon to hold the upper edge of the slide centered, or spring means, such as 92, may be employed to aid the weight in its function of engaging and centering the slide's upper edge. The V-shaped groove in the carrier will serve to center the opposite edge. Spring 92 is preferably a lightweight coil spring and is fitted centrally in a recess in the block so as to have its upper end pressing against the top plate of the supporting frame. Or, if desired, a small V-grooved roller carried by a pin which has its ends arranged to rotate and move vertically in a pair of equivalent slots in the side plates could be employed in place of block 80.

It will be appreciated that while the several parts making up the slide carrier and supporting frame structure of the invention are of an inexpensive character and may be assembled readily, they, nevertheless, provide a construction which will easily and accurately locate slides of various thicknesses in a proper predetermined position in a projector for projection purposes. Furthermore, the guiding means for the slide carrier and the V-shaped centering means for the top of the slide could, if desired, be mounted fixedly upon parts of a projector and function with a carrier of the type shown and in the manner described above for accurately positioning slides for projection purposes.

Having described our invention, we claim:

1. A slide-supporting assembly adapted to be positioned in a projector or the like and to support lantern slides of varying thicknesses in the light beam of the projector with the picture-carrying medium of each slide, when so positioned, disposed substantially in a predetermined projection plane within said assembly, said assembly comprising a normally stationary supporting frame and a movable slide carrier supported thereby, said supporting frame comprising a vertically disposed main wall portion having a projection aperture therein and upper and lower supporting and guiding portions for causing said slide carrier to move along a predetermined path transversely of said light beam when actuated by the operator of the projector, a plurality of lantern slide openings formed in said slide carrier, a pair of spaced grooves in said carrier communicating with each opening and disposed at opposite sides thereof and of such width as to loosely receive opposite edge portions of a lantern slide when inserted therein, a horizontal groove in said carrier adjacent each opening and intermediate each pair of spaced grooves, each horizontal groove having inwardly and downwardly sloping surfaces arranged to support and center the bottom edge of the inserted slide, and slide-centering means carried by said upper supporting portion of said frame and including a downwardly facing grooved portion extending in the same general direction as said upwardly facing groove and arranged for up and down movement relative to said frame, and having opposed inwardly and upwardly sloping surfaces formed thereon, the sloping surfaces of said grooves when in opposed relation at said projection aperture jointly serving to support the picture carrying medium of the lantern slide therebetween substantially in said predetermined projection plane.

2. A slide-supporting assembly as defined in claim 1 and in which said slide-centering means includes a member in the form of a vertically movable weight having said downwardly facing groove formed in the lower portion thereof.

3. A slide-supporting assembly as defined in claim 1 and in which said slide-centering means includes a flexible leaf spring having one portion thereof fixedly secured relative to said frame and another portion thereof movable relative to said frame and so shaped as to provide said downwardly facing groove.

4. A slide-supporting assembly adapted to be positioned in a projector or the like and to support lantern slides of varying thicknesses in the light beam of the projector with picture-carrying medium of each slide, when so positioned, disposed substantially in a predetermined projection plane within said assembly, said assembly comprising a supporting frame having a vertically disposed main wall portion and upper and lower supporting portions, a projection aperture formed in said main wall portion for the passage of said light beam therethrough, slide receiving and positioning means carried by said lower supporting portion and including an elongated member extending from a position beneath said aperture outwardly beyond said projector sufficiently to receive a lantern slide in an initial position and including an upwardly facing groove having opposed inwardly and downwardly sloping surfaces arranged to loosely receive and center the bottom edge of a lantern slide relative to said predetermined plane when the slide is initially inserted in said groove, the upper edge of said slide at such time being free for at least limited sideways movement for ease of insertion in said slide receiving and positioning means, the inwardly sloping surfaces of said groove also serving to support and center the bottom edge of said slide when the slide is moved into projection position in alignment with said projection aperture, slide-centering means carried by said upper supporting portion and including a downwardly facing grooved portion extending generally in the direction of said upwardly facing groove and arranged for movement toward and away from said upwardly facing groove, and having opposed inwardly and upwardly sloping surfaces formed thereon, said downwardly facing grooved portion being normally positioned adjacent the upper edge of said projection aperture and so disposed as to engage the top edge of said slide and hold same centered relative to said predetermined plane when the slide is aligned with said aperture, said assembly, when said lantern slide is in aligned position adjacent said projection aperture, embodying means extending outwardly to one side of said aperture for freely receiving and initially positioning a second lantern slide and being arranged for actuation by the operator of the projector, and having a surface thereon for engaging a vertical edge of said second slide and for moving said second slide from its initial position into alignment with said aperture when said outwardly extending means is actuated by the operator, and for simultaneously causing the first mentioned lantern slide to be moved out of alignment with said projection aperture and to a position wherein it may be freely removed from the assembly.

5. A slide-supporting assembly as defined in claim 4 and in which said slide-centering means includes a member in the form of a vertically movable weight having said downwardly facing groove formed in the lower portion thereof.

6. A slide-supporting assembly as defined in claim 4 and in which said slide centering means includes a flexible leaf spring having one portion thereof fixedly secured relative to said frame and another portion thereof movable relative to said frame and so shaped as to provide said downwardly facing groove.

DAVID D. LOWBER.
ALBIN A. GRADISAR.
DAVID I. CRITOPH.

REFERENCES CITED

The following references are of record in the file of this patent:

UNITED STATES PATENTS

| Number | Name | Date |
|---|---|---|
| 945,619 | Sharlow | Jan. 4, 1910 |
| 1,012,945 | Warner | Dec. 26, 1911 |
| 1,035,872 | Goodrich | Aug. 20, 1912 |
| 1,108,256 | Sharlow | Aug. 25, 1914 |
| 2,147,260 | Lewis | Feb. 14, 1939 |
| 2,298,369 | Greaves | Oct. 13, 1942 |
| 2,298,413 | Reid | Oct. 13, 1942 |
| 2,335,326 | Walter | Nov. 30, 1943 |

FOREIGN PATENTS

| Number | Country | Date |
|---|---|---|
| 435,599 | France | Dec. 29, 1911 |
| 485,498 | Great Britain | May 20, 1938 |
| 215,992 | Switzerland | July 31, 1941 |